UNITED STATES PATENT OFFICE 2,684,367

ALKOXYPHENYL-ALKOXY-ACRIDANES

Donalee L. Tabern, Lake Bluff, Ill., assignor to Abbott Laboratories, North Chicago, Ill., a corporation of Illinois No Drawing. Original application October 19, 1948, Serial No. 55,424. Divided and this application October 19, 1950, Serial No. 191,088

11 Claims. (Cl. 260—279)

The present application is a divisional application of my earlier application, Serial No. 55,424 of October 19, 1948, now U. S. Patent No. 2,645,594, which is in turn a continuation-in-part of my original application, Serial No. 781,758, filed October 23, 1947, now abandoned.

There are disclosed in my earlier applications Ser. No. 781,758 and Ser. No. 55,424 acridane compounds which I have discovered to have unique and unexpected properties as antiseptics. More particularly these compounds have the following structure:

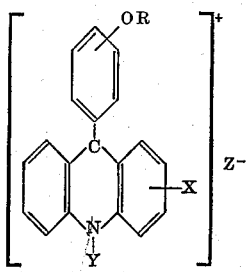

wherein R is an alkyl group containing from one to fourteen carbon atoms inclusive; X is a monovalent radical selected from the class comprising hydrogen, halogen, alkyl and alkoxy groups; Y is a hydrocarbon group containing from one to ten carbon atoms inclusive and Z is a mineral acid anion.

As disclosed in my earlier applications the above mineral acid salts of these acridanes are sometimes difficult to purify. Frequently repeated recrystallization results in no improvement in purity since it only accomplishes further decomposition. I have discovered that the corresponding 9-alkoxyacridanes of the present invention are excellent intermediates for the purification of the above mineral acid salts. These compounds are easily purified and are an excellent source for obtaining pure acridane mineral acid anion salts. The 9-alkoxyacridane derivative of the mineral acid anion salts may be prepared by adding an excess of alkali to a solution of the acridane mineral acid anion salt to produce the corresponding acridol. By simply warming the acridol formed with an alcohol, the corresponding 9-alkoxyacridane of the present invention is obtained. My investigation shows that the methoxyl derivative obtained by refluxing with methyl alcohol gives the more desirable 9-alkoxyacridane compounds.

The above reaction may be illustrated by the following equation:

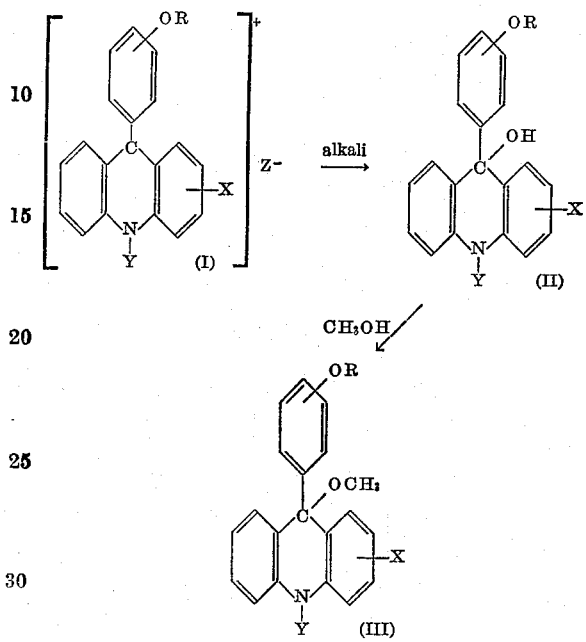

wherein R is an alkyl group containing from one to fourteen carbon atoms inclusive; X is a monovalent radical selected from the class comprising hydrogen, halogen, alkyl and alkoxy groups; Y is a hydrocarbon group containing from one to ten carbon atoms inclusive selected from the class consisting of alkyl, aralkyl and aryl groups; Z is a mineral acid anion such as chlorine, bromine, iodine and sulfate.

This equation illustrates the reaction using methanol to produce the corresponding 9-methoxyl compound.

An object of my invention is to produce a series of 9-alkoxyphenyl-9-alkoxyacridanes which are useful intermediates in producing the corresponding 9-mineral acid anion salts.

My invention relates to 9-alkoxyphenyl-9-acridane compounds of which the alkyl group of the alkoxyphenyl substituent contains from one to fourteen carbon atoms inclusive and the alkoxy group in the 9-position has an alkyl group containing from one to four carbon atoms inclusive. More particularly the preferred compounds of my invention may be illustrated by the following formula:

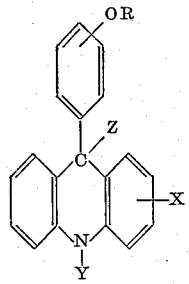

wherein R is an alkyl group containing from one to fourteen carbon atoms inclusive; X is a monovalent radical selected from the class comprising hydrogen, halogen, alkyl and alkoxy groups; Y is a hydrocarbon group containing from one to ten carbon atoms inclusive selected from the class consisting of alkyl, aralkyl and aryl groups; and Z is an alkoxy group (the alkyl group of which contains from one to four carbon atoms inclusive).

As has been stated, the preferred compounds of the invention are those where Z is a methoxyl group.

The following examples illustrate the preparation of the 9-acridols and the 9-alkoxyacridanes.

EXAMPLE I 9-(p-hexoxyphenyl)-9-methoxy-10-methyl acridane

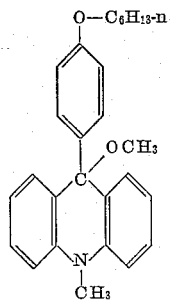

An aqueous solution of 9-(p-hexoxyphenyl)-10-methyl acridane chloride or the bisulphate or a bromide is covered with ether and treated with a dilute solution of alkali. The ether layer is separated, washed free of alkali and dried over anhydrous magnesium sulphate and absorbing charcoal. The solution is filtered and concentrated to a residue. The residue is dissolved in n-hexane, the solution evaporated to a small volume. On cooling, the compound 9-(p-hexoxyphenyl)-10-methyl-9-acridol crystallizes from the solution having a melting point of 85° C.

The above mentioned acridol is refluxed in absolute methanol. On cooling, the compound 9-(p-hexoxyphenyl)-9-methoxy-10-methyl acridane crystallizes out, is filtered, washed with methanol and dried in vacuum at 50° C. This compound has a melting point of 77–78° C.

EXAMPLE II

9 - (p - methoxyphenyl) - 9 - methoxy - 10 - phenyl acridane

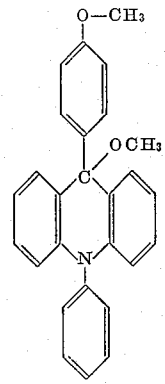

In accordance with the procedure of Example I and starting with the compound 9-(p-methoxyphenyl)-10-phenyl acridane chloride, the compound 9-(p-methoxyphenyl)-10-phenyl-9-acridol is obtained upon treatment with alkali. This compound has a melting point of 152–155° C.

Treatment of the above mentioned acridol with methanol yields the compound 9-(p-methoxyphenyl)-9-methoxy-10-phenyl acridane, having a melting point of 158.5–160.5° C.

EXAMPLE III

9 - (o - methoxyphenyl) - 9 - methoxy - 10 - methyl acridane

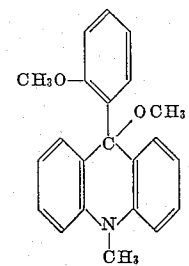

Following the procedure of Example I but using 9-(o-methoxyphenyl)-10-methyl-acridane chloride, the compound 9-(o-methoxyphenyl)-10-methyl-9-acridol is obtained upon alkali treatment. This compound has a melting point of 132–135° C.

The treatment of the above acridol with methanol yields 9-(o-methoxyphenyl)-9-methoxy-10-methyl acridane, having a melting point of 162–163° C. with decomposition.

EXAMPLE IV

9 - (p - n - butoxyphenyl) - 9 - methoxy - 10 - methyl acridane

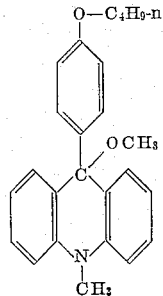

By following the procedure of Example I but starting with the compound 9-(p-n-butoxyphenyl)-10-methyl acridane chloride, the compound 9-(p-n-butoxyphenyl)-10-methyl-9-acridol is obtained upon alkali treatment. This compound has a melting point of 103–105° C.

The above acridol is converted to the compound 9 - (p - n - butoxyphenyl) - 9 - methoxy - 10-methyl acridane upon refluxing with methanol. This compound has a melting point of 102–103° C. A mixed melting point determined between this compound and the acridol precursor gives a melting point of 83–88° C. showing that the two compounds are different.

EXAMPLE V

9 - (p - n - hexoxyphenyl) - 9 - methoxy - 10 - ethyl acridane

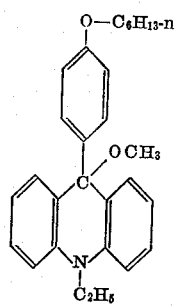

By following the procedure of Example I starting with the compound 9-(p-n-hexoxyphenyl)-10-ethyl acridane chloride, the compound 9-(p-n-hexoxyphenyl)-10-ethyl-9-acridol is prepared upon treatment with alkali. The refluxing of this acridol compound with methanol produces the compound 9-(p-n-hexoxyphenyl)-9-methoxy-10-ethyl acridane.

EXAMPLE VI

9 - (p - n - hexoxyphenyl) - 9 - methoxy - 10 - benzyl acridane

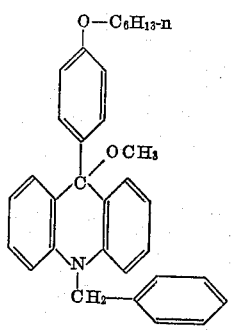

By following the procedure of Example I but starting with 9-(p-n-hexoxyphenyl)-10-benzyl acridane chloride, the compound 9-(p-n-hexoxyphenyl)-10-benzyl-9-acridol is prepared upon treatment with alkali. This compound has a melting point of 126.5–128.5° C. Refluxing of this acridol compound with methanol produces the compound 9-(p-n-hexoxyphenyl)-9-methoxy-10-benzyl acridane, having a melting point of 118.5–120.5° C.

EXAMPLE VII

9 - (p - n - octyloxyphenyl) - 9 - methoxy - 10 - methyl acridane

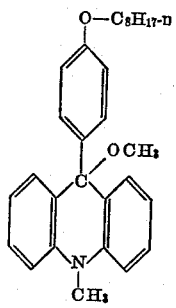

By following the procedure of Example I but starting with 9-(p-n-octyloxyphenyl)-10-methyl acridane chloride, the compound 9-(p-n-octyloxyphenyl)-10-methyl-9-acridol is obtained on treatment with alkali. This acridol upon refluxing with methanol is converted to the compound 9 - (p - n - octyloxyphenyl) - 9 - methoxy - 10 - methyl acridane, which has a melting point of 72–75° C.

EXAMPLE VIII

9 - (p - 2 - ethylbutoxyphenyl) - 9 - methoxy - 10-methyl acridane

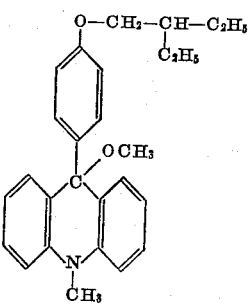

By proceeding according to Example I but starting with 9-(p-2-ethylbutoxyphenyl)-10-methyl acridane chloride, the compound 9-(p-2-ethylbutoxyphenyl)-10-methyl-9-acridol is prepared upon treatment with alkali. Upon refluxing this acridol with methanol, the compound 9-(p-2-ethylbutoxyphenyl) - 9 - methoxy-10-methyl acridane is prepared.

EXAMPLE IX 2,9-methoxy-9-(p-n-hexoxyphenyl)-10-methyl acridane

By following the process of Example I but starting with 2-methoxy-9-(p-n-hexoxyphenyl)-10-methyl acridane chloride, the compound 2-methoxy-9-(p-n-hexoxyphenyl)-10 - methyl-9-acridol is obtained upon treatment with alkali. Upon refluxing this acridol with methanol the compound 2,9-methoxy - 9 - (p-n-hexoxyphenyl)-10-methyl acridane is formed.

EXAMPLE X

*1-chloro-9-methoxy-9-(p-n-hexoxyphenyl)-4,10-dimethyl acridane*

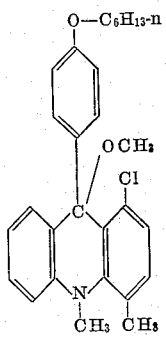

By following the process of Example I, but starting with 1-chloro-9-(p-n-hexoxyphenyl)-4,10-dimethyl acridane chloride, the compound 1-chloro-9-(p-n-hexoxyphenyl)-4,10-dimethyl-9-acridol is formed by the treatment with alkali. This acridol is in the form of nearly colorless crystals and has a melting point of 103.5–105.5° C. Upon refluxing this acridol with methanol, the compound 1-chloro-9-(p-n-hexoxyphenyl)-4,10-dimethyl acridane is formed. This compound is a liquid at room temperature.

EXAMPLE XI

*9-(p-n-decyloxyphenyl)-9-methoxy-10-methyl acridane*

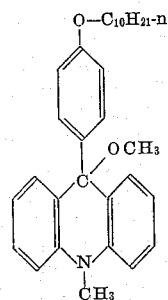

By following the procedure of Example I but starting with 9-(p-n-decyloxyphenol)-10-methyl acridane chloride, the compound 9-(p-n-decyloxyphenyl)-10-methyl-9-acridol is obtained. Upon refluxing this acridol with methanol the compound 9-(p-n-decyloxyphenyl)-9-methoxy-10-methyl acridane is formed.

The required acridane mineral acid anion salts used in the above examples will be found disclosed in my parent application Serial No. 55,424.

As examples of other 9-acridol compounds and 9-methoxy derivatives which may be prepared are 9-(p-n-hexoxyphenyl)-10-n-decyl-9-acridol, 9-(p-methoxyphenyl)-9-methoxy-10-n-decyl acridane, 9-(p-n-tetradecyloxyphenyl)-10-methyl-9-acridol and 9-(p-n-tetradecyloxyphenyl)-9-methoxy-10-methyl acridane.

Also, by replacing the methanol used for converting the acridols to the corresponding 9-alkoxy derivatives with other alcohols, ethers of other alkyl groups may be prepared. For example by refluxing 9-(p-n-hexoxyphenyl)-10-methyl-9-acridol with ethanol, 9-(p-n-hexoxyphenyl)-9-ethoxy-10-methyl acridane with n-butanol, 9-(p-n-hexoxyphenyl)-9-n-butoxy-10-methyl acridane.

Others may readily adapt the invention for use under various conditions of service, by employing one or more of the novel features disclosed herein, or equivalents thereof. As at present advised with respect to the apparent scope of my invention, I desire to claim the following subject matter.

I claim:
1. Acridane compounds represented by the formula:

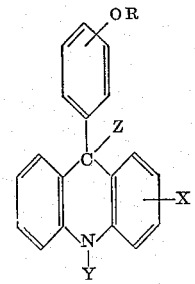

wherein R is an alkyl group containing from one to fourteen carbon atoms inclusive, X is a monovalent radical selected from the class consisting of hydrogen, halogen, lower alkyl and lower alkoxy groups; Y is a hydrocarbon group containing from one to ten carbon atoms inclusive, selected from the class consisting of alkyl, monocyclic aralkyl and monocyclic aryl groups; and Z is an alkoxyl group, the alkyl group of which contains from one to four carbon atoms inclusive.

2. The compound 9-(p-n-hexoxyphenyl)-9-methoxy-10-methyl acridane.
3. The compound 9-(p-n-butoxyphenyl)-9-methoxy-10-methyl acridane.
4. The compound 9-(p-n-hexoxyphenyl)-9-methoxy-10-ethyl acridane.
5. The compound 9-(p-n-octyloxyphenyl)-9-methoxy-10-methyl acridane.
6. The compound 9-(p-n-decyloxyphenyl)-9-methoxy-10-methyl acridane.
7. A compound represented by the formula

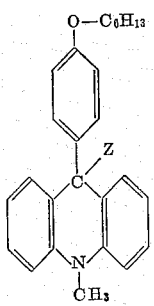

in which Z is lower alkoxy.

8. A compound represented by the formula

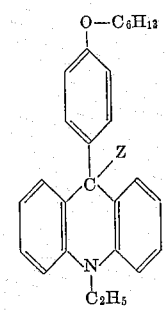

in which Z is lower alkoxy.

9. A compound represented by the formula

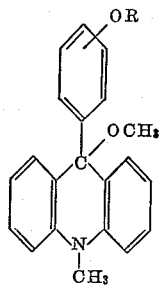

in which R is an alkyl group containing from one to fourteen carbon atoms inclusive.

10. A compound represented by the formula

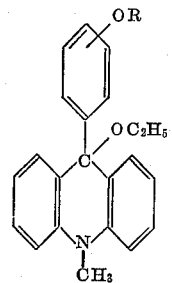

in which R is an alkyl group containing from one to fourteen carbon atoms inclusive.

11. A compound represented by the formula

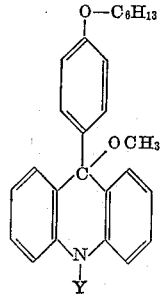

in which Y is a hydrocarbon group containing from one to ten carbon atoms inclusive selected from the class consisting of alkyl, monocyclic aralkyl and monocyclic aryl groups.

References Cited in the file of this patent

Drozdov: J. Gen. Chem. (U. S. S. R.), vol. 16, pp. 244–250 (1946).

Wiselogle: "Survey of Antimalarial Drugs, 1941–1945" (J. W. Edwards, Ann Arbor, Mich., 1946), vol. II, page 585.